Patented May 6, 1941

2,240,582

UNITED STATES PATENT OFFICE 2,240,582

POLYMER COMPOSITION

William J. Sparks, Cranford, N. J., assignor to Standard Oil Development Company, a corporation of Delaware No Drawing. Application June 9, 1938,
Serial No. 212,701

5 Claims. (Cl. 260—43)

The present invention relates to an improved stabilized polymer composition and to methods for producing the same. The invention will be fully understood from the following description.

During the last several years valuable polymers have been made from olefins, especially iso-olefins of from 4 to 5 carbon atoms such as isobutylene and iso-amylene. Briefly, these polymers are prepared by polymerization of the olefin while in liquid phase at temperatures continuously maintained below —10° C., and preferably well below this temperature, for example at —40 to —80° C., or —100° C., using active halide catalysts such as aluminum chloride, zinc chloride, and titanium fluoride, but particularly boron fluoride. A particularly effective catalyst consists of aluminum chloride dissolved in ethyl chloride, methyl chloride, carbon disulfide and similar solvents. The polymers range from viscous liquids, having molecular weights from about 800 to 15,000 or 20,000, to gummy solid materials having molecular weights of 30,000 to 75,000 or 80,000, up to hard, solid rubber-like products having molecular weights from 200,000 to 250,000. These molecular weights are measured by the Staudinger viscosity method.

One difficulty with the present materials is that they have a tendency to break down in the presence of actinic light, although the decomposition is slow, for example in sunlight, but nevertheless it is too great to be satisfactory in the presence of ultra-violet light such as produced by mercury vapor lamps and other strong sources of ultraviolet light when continuously exposed to strong sunlight.

It has been found, however, that the difficulty can be overcome very simply by incorporating with these polymers a minor amount of a resin of the phenolic-aldehyde type. While many types of resins have been incorporated with these hydrocarbon polymers, the phenolic-aldehyde resins and in particular the oil-soluble ones have been found to give marked improvement in the light stability of the polymer. There are many types of resins of the phenolic-aldehyde type, some of them being water soluble, some soluble in oils and others insoluble in all solvents. Some of these resins are fusible, others are infusible. Most of the resins are insoluble in the polymers described herein and these insoluble ones are less useful for the present purpose than the soluble ones although it will be understood that they may be ground or pulverized and incorporated with the polymer as insoluble fillers. The particular resins, to which this invention is of greatest importance, are those of the oil-soluble phenolic-aldehyde type, which are soluble in the polymers themselves, and it is these that are found to increase the resistance to break down in the presence of actinic light very greatly.

While particular oil-soluble resins and their method of manufacture are known in the art, it may be desirable to state or review in general some of the other methods by which they have been prepared, although such methods form no part of the present invention. One of such methods is to modify the resin by the addition of suitable oil-soluble natural or artificial resins, for example rosin, copal, polycoumarone type resins, rosin esters and the like. Usually the phenolic aldehyde resin is condensed in the presence of an acid catalyst and the reaction is stopped at the point where the reaction mixture becomes turbid. The resin is then recovered and is heated or fused with the modifying compound. Another method of making the product is to add a modifying agent to the resin ingredients and prepare the mixture in situ.

Other methods have been used to produce resins which are oil-soluble by adding drying oils during the condensation, particularly oils such as tung oil, but perhaps the most satisfactory method is to modify the character of the phenol or aldehyde which is used. Simple phenol ordinarily produces materials which are not oil-soluble, but by using ortho or para cresol, xylol or mixed xylenols, anisole and the like, oil-soluble materials can be prepared. The oil solubility increases with the number of alkyl groups and the number of carbon atoms in the said alkyl radicals. Phenols containing cyclo paraffinic radicals such as cyclo hexanyl phenol have been used for the purpose and it should be also noted that certain unalkylated phenols such as hydroxy diphenyl are also useful in giving oil condensation products on condensation with suitable aldehydes. In the same manner, the aldehyde itself may be modified, i. e., by increasing the hydrocarbon portion of the molecule so as to assist in producing an oil-soluble product.

Among the commercial products which are found to be the most useful is a material produced and sold under the trade name "Bakelite resin 1329." This material is soluble in the polymer and produces an excellent resistance to break down by ultra-violet light, besides increasing the original tensile strength. This resin is of the class designated as 100% phenolic oil-soluble resins or as unmodified oil-soluble phenolic-aldehyde resins, which embrace those resins which are derived from substituted phenols, particularly alkyl phenols, such as phenols which are isomeric to xylenol and trimethyl phenol. Further identifying properties of this resin, in addition to its negative rosin test, are its high melting point of the order of 300° F., specific gravity of about 1.1, and acid number of about 50.

The amount of the resin required for the present purposes varies considerably with the particular compound being employed, some naturally being more effective than others. It is generally desired to preserve the original properties of the hydrocarbon polymer insofar as possible and therefore to use as little of the resin as possible. Furthermore, since the polymers themselves are colorless and it is often found desirable to maintain this quality, the amount of the resin should be as little as possible to obtain the desired effect, because increasing the resin naturally darkens the color of the mixture. From about 20 to 35% of resin has been used successfully to give a high stability against deterioration in the presence of light, but smaller amounts, 5 to 15%, than this may be used with good practical results and in some cases more may be employed, say 50% or more where darkening is not particularly objectionable, but in such mixture the primary character of the polymer is considerably affected.

The materials may be mixed by milling cold or warm, but in the case of the very high molecular weight polymers it has been found that excessive milling tends to decrease molecular weight and it is usually preferable to incorporate the resin in some solvent such as naphtha, benzol, heavier oils such as lubricating oils or the like, either without milling or to assist during milling. The solvent may be removed subsequently by evaporation, but in many cases where the amount used is small, it may be allowed to remain. When making sheets, films or rods, it is often desirable to incorporate the resin only in a surface layer of the polymer which is exposed to the actinic rays, and in this way the amount of the resin may be decreased and the body of the material may be maintained free from the resin.

As an example of the effect of ultra-violet light on these hydrocarbon polymers, and the effect of the addition of the oil-soluble resins, the following example is given:

Example I

An isobutylene polymer prepared by polymerization in the liquid phase of a highly purified isobutylene at temperature of the order of −80° C. using boron fluoride as the catalyst, had a molecular weight of 80,000 measured by the Staudinger viscosity method. This material was hard and rubber-like, elastic, non-tacky, water-white in color, odorless and clear. One sample of the material was milled for 10 minutes and then rolled to a sheet of $\frac{1}{16}$" thickness. This polymer was not mixed with other ingredients. A second sample of the same polymer was mixed with "Bakelite" resin known as "B. R. 1329" in proportion of 80 parts of the former to 20 parts of the latter. The mixing was accomplished by milling on rolls and the time required was 10 minutes. The mixture was then rolled into sheet form to $\frac{1}{16}$" thickness, just as was the case in the prior sample.

These two samples were then exposed under the same conditions to strong ultra-violet light for a period of 20 hours continuously. The first sample was broken down to a large extent, as indicated by the tacky surface and the reduced tensile strength. The treated sample was not noticeably attacked.

Example II

An isobutylene polymer having a molecular weight of about 150,000 mixed with Bakelite resin 1329 in the ratio of 80:20 parts by weight was milled for 15 minutes at 130° C. in a Banbury mixer, then sheeted on a rubber mill to .08 inch thickness. Samples of these sheets were placed in a mold and pressed at 130° C. to produce test specimen strips of .15 inch thickness and .25 inch width. These samples were then tested in a Scott machine and broke at 15 pounds scale pull indicating a tensile strength of 400 lbs. per sq. in.

A sample of the same polymer unmixed with anything else was treated just as outlined above, that is milled for 15 minutes, sheeted, and molded to produce the specimen. This sample had a tensile strength of 157 lbs. per sq. in.

Samples of the blended and unblended polymers were then exposed to ultra-violet light for 2 hours under the same conditions and the samples were then tested. The unblended samples showed a great decrease in tensile strength, 80 lbs. per sq. inch, while the blended sample showed no decrease whatever.

Example III

Samples of another polymer made up as in the previous example were tested both before and after exposure to ultra-violet light for 20 hours. The data are as follows:

| Sample | Tensile strength | |
|---|---|---|
| | Before exposure | After exposure |
| 80% isobutylene polymer—20% resin | 373 | 346 |
| 100% isobutylene polymer | 240 | 26.7 |

In other tests it has been found that with less than one part of the resin to four of the polymer, substantially the same degree of resistance to depolymerization could be obtained as was indicated in the previous example, but with much less darkening in color due to the smaller use of the resin. As the percentage of resin increases over about 20% or 35%, the color becomes darker and it is somewhat softened, but its resistance to ultra-violet light is not proportionately improved.

The present composition comprising the high molecular weight iso-olefin polymers and the oil-soluble phenolic-aldehyde resin may be used alone for various compositions or may be mixed with other ingredients such as paraffin or other waxes, asphalts, resins, particularly the hydrocarbon resins which are freely soluble in the polymer, rubber or synthetic rubbers, which may be either vulcanized or unvulcanized, containing oxygen, chlorine or other substituents, fillers of the metal or metal compounds, or carbon black and the like. The compounds may be employed for various uses, but particularly where the material is to be subjected to ultra-violet or other strong actinic rays.

This invention is not to be limited to any theory of the action of the materials in resisting break down by ultra-violet light, nor to any particular resin composition or polymer, but only to the following claims in which it is desired to claim all novelty inherent in the invention.

I claim:

1. A composition of matter comprising a solid iso-olefin polymer of high molecular weight, said polymer being a gummy to tough rubber-like material with substantial tensile strength and normally subject to deterioration when subjected to the action of actinic light, and admixed with said polymer a minor proportion of an unmodified oil-soluble phenolic-aldehyde resin.

2. A composition of matter comprising a major proportion of a solid rubber-like polymer of isobutylene having a molecular weight in excess of 30,000, and dissolved therein a minor amount of an unmodified oil-soluble phenolic-aldehyde resin derived from a substituted phenol.

3. A composition according to claim 2, in which the amount of said resin is from 5% to 35%.

4. A composition of matter comprising an isobutylene polymer having a molecular weight of the order of about 80,000 to about 150,000 blended with a minor amount of an unmodified oil-soluble alkyl phenol-aldehyde resin, said resin being present in a sufficient amount to substantially increase the tensile strength of the composition and to increase resistance of the polymer to the action of ultra-violet light.

5. A composition according to claim 4, in which said resin is present in the proportion of about 20 parts to about 80 parts of said isobutylene polymer.

WILLIAM J. SPARKS.